(12) United States Patent
Guilemond et al.

(10) Patent No.: US 11,656,137 B2
(45) Date of Patent: May 23, 2023

(54) METHOD FOR FRICTION COMPENSATION IN A POWER STEERING SYSTEM AND ASSOCIATED ESTIMATION METHOD

(71) Applicant: JTEKT EUROPE, Irigny (FR)

(72) Inventors: Alain Guilemond, Marennes (FR); Sébastien Bourdrez, Yzeron (FR); Tahar Slama, Ecully (FR); Pascal Moulaire, La Tour de Salvagny (FR); Nicolas Baudouin, Lyons (FR)

(73) Assignee: JTEKT EUROPE, Irigny (FR)

( * ) Notice: Subject to any disclaimer, the term of this patent is extended or adjusted under 35 U.S.C. 154(b) by 377 days.

(21) Appl. No.: 16/763,905

(22) PCT Filed: Oct. 23, 2018

(86) PCT No.: PCT/FR2018/052635
§ 371 (c)(1),
(2) Date: May 13, 2020

(87) PCT Pub. No.: WO2019/092341
PCT Pub. Date: May 16, 2019

(65) Prior Publication Data
US 2020/0370979 A1  Nov. 26, 2020

(30) Foreign Application Priority Data

Nov. 13, 2017 (FR) .................................. 17/60639

(51) Int. Cl.
*G01L 5/22* (2006.01)
*B62D 5/04* (2006.01)
*B62D 6/00* (2006.01)

(52) U.S. Cl.
CPC ............ *G01L 5/221* (2013.01); *B62D 5/0481* (2013.01); *B62D 6/008* (2013.01)

(58) Field of Classification Search
CPC ........ G01L 5/221; B62D 5/0481; B62D 6/008
See application file for complete search history.

(56) References Cited

U.S. PATENT DOCUMENTS

2011/0224876 A1\* 9/2011 Paholics .............. B62D 5/0463
701/42
2012/0150389 A1  6/2012 Oblizajek et al.
(Continued)

FOREIGN PATENT DOCUMENTS

CN       105045103 A    11/2015

OTHER PUBLICATIONS

Wilhelm Frederic et al: "Friction Compensation Control for Power Steering", IEEE Transactions on Control Systems Technology, IEEE Service Center, New York, NY, US, vol. 24, No. 4, Jul. 2016 (Jul. 2016), pp. 1354-1367. (Year: 2016).\*
(Continued)

*Primary Examiner* — Ig T An
(74) *Attorney, Agent, or Firm* — Oliff PLC

(57) ABSTRACT

A method in which a continuous estimation of the intermediate friction rate is carried out, allowing the integration of the method into a general friction compensation method so as to continuously improve the feel on the steering wheel, particularly for speeds below a determined threshold. Also, a method for friction compensation in an electrical power steering system, characterised in that the compensation method takes into account a continuous estimation of the intermediate friction rate obtained by the estimation method.

6 Claims, 3 Drawing Sheets

(56) References Cited

U.S. PATENT DOCUMENTS

Figure 1:
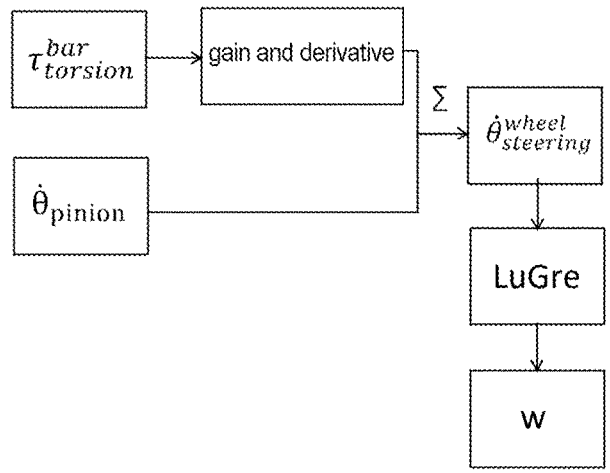

2014/0149000 A1* 5/2014 Tamura ............... B62D 5/0463
  701/42
2019/0256126 A1* 8/2019 George ............... G01M 17/02

OTHER PUBLICATIONS

Wilhelm Frederic et al: "Modeling and compensating friction in power steering", 2015 European Control Conference (ECC), EUCA, Jul. 15, 2015 (Jul. 15, 2015), pp. 2138-2143 (Year: 2015).*

Tamura et al: "Modeling and simulation for dynamic analysis of column type electric power steering", JTEKT Engieering journal English edition, No. 1010E, 2013 pp. 19-25 (Year: 2013).*

Wilhelm et al., "Modeling and Compensating Friction in Power Steering," 2015 European Control Conference (ECC), Jul. 15-17, 2015, Linz, Austria, pp. 2138-2143.

Wilhelm et al., "Friction Compensation Control for Power Steering," IEEE Transactions on Control Systems Technology, Jul. 2016, vol. 24, No. 4, pp. 1354-1367.

Tamura et al., "Modeling and Simulation for Dynamic Analysis of Column Type Electric Power Steering," JTEKT Engineering Journal, English Edition No. 1010E, 2013, pp. 19-25.

Jan. 4, 2019 International Search Report issued in International Patent Application No. PCT/FR2018/052635.

* cited by examiner

METHOD FOR FRICTION COMPENSATION IN A POWER STEERING SYSTEM AND ASSOCIATED ESTIMATION METHOD

The present invention relates to the technical field of the electric power steering systems and in particular to the driver's feeling on the steering wheel.

There are several types of power steering systems and the invention relates to the electric power steering systems called «D.A.E.», which uses an electric motor to assist the driver in the steering of his vehicle.

The first objective of the electric power steering is the assistance that is to say the reduction of the steering wheel/driver torque on a movement which is set. Thus, a steering wheel/driver torque sensor is configured to measure the torque exerted by the driver on the steering column of the vehicle and a computer determines the associated assistance and drives the electric motor of the electric power steering depending on the measured torque and the driving conditions to provide an additional torque on the pinion of the rack connected, on the one hand, to the steering wheel by the steering column and, on the other hand, to the wheels by means of steering tie rods. The second objective of the electric power steering is to provide the driver with a good feeling on the steering wheel, which is called a «steer feel».

The failure of these first «assistance laws» which are based only on the steering wheel/driver torque, is that the driver feels a lot of the mechanical friction of the steering, which is considered to be imprecise. Indeed, on small movements, in particular close to zero, when there is very little torque, if there is a movement in one direction, the torque is released, the assistance stops and the driver has a feeling of sticking at the friction of the steering, that is to say that the mechanical friction of the electric power steering reduces or even cancels the rack movements under low load of driver effort, which degrades the driving accuracy by imposing strong and non-linear driver torque variations to achieve fine movement corrections. A hysteresis will then be considered: that is to say that the steering wheel/driver torque in one direction is different from the steering wheel/driver torque in the other direction. In order to improve the feeling, it is necessary to reduce this hysteresis, by continuously compensating for the mechanical friction of the steering, including on low driver loads and therefore very low displacement speeds.

When the speed is clearly set, for example when it is greater than 20°/s, it is fairly easy to compensate for the friction thanks to the measurements of the motor speed sensor of the electric power steering. Indeed, the direction of the movement can be detected and the friction can be compensated for, as physically the dynamic friction is of a certain value opposite to the movement.

However, a friction compensation function in the sticking area, that is to say for displacement speeds less than about 2% in absolute value, implies the need to know how to estimate, finely and therefore in real time, an intermediate friction rate less than 1 in absolute value. This request is therefore much more restrictive than the need corresponding to other friction compensation functions based solely on a speed signal of the motor of the electric power steering and therefore inactive for absolute values of motor speed below a threshold in order to avoid oscillation phenomena necessarily induced by the sensor noise.

There is no physical sensor which can allow measuring the intermediate friction rate. This intermediate friction rate can however be estimated by a mathematical model. There are many models estimating the friction, but which pose problems of discontinuity on cycles of low amplitude and therefore induce feeling defects on the steering wheel when they are associated with friction compensation functions.

The invention aims at overcoming all or part of the aforementioned drawbacks by proposing a method for continuous estimation of the intermediate friction rate, allowing its integration into a global friction compensation method by means of an assist motor in order to continuously improve the feeling on the steering wheel and in particular for displacement speeds less than a determined threshold, the threshold being comprised between substantially 0.5°/s and 3°/s in absolute value, preferably between substantially 1.5°/s and 2.5°/s in absolute value and even more preferably 2°/s.

Therefore, the invention relates to a method for continuous estimation of the intermediate friction rate, in particular for displacement speeds less than a determined threshold, in an electric power steering of a vehicle, characterized in that said estimation method comprises the following steps:

a) Measurement of a first speed, said measurement being carried out by a speed sensor configured to measure the speed of the electric motor of the electric power steering, b) Determination of a second speed from a measurement of the steering wheel/driver torque, said torque measurement being carried out by a torque sensor configured to measure the torque between the steering wheel and the rack of the electric power steering, c) Sum of the first speed and the second speed, the sum being referred to as steering wheel speed, d) Application of the LuGre model to the sum determined in step (c) used as input of said model e) Obtaining a continuous estimation of the intermediate friction rate (w).

The determination of a second speed, corresponding to the steering wheel/driver torque, by the estimation method according to the invention allows taking into account the very low loads of the driver on the steering wheel. Indeed, on the very low loads of the driver, friction present between the steering wheel and the electric motor, linked to the various parts and mechanical meshings of the power steering, prevents a load of the electric motor. Thus the first speed is zero.

The determination of a second speed thus allows taking into account and therefore effectively compensating for the friction of the power steering for low loads of the driver on the steering wheel.

The sum of the first speed and the second speed allows taking into account both the low loads of the driver on the steering wheel, via the second speed, and the low loads rising from the running surface and directly biasing the rack, via the first speed.

Advantageously, the estimation method according to the invention uses a LuGre model which does not have a problem of discontinuity. The LuGre model uses an integration principle and has properties of representation of the friction cycles while allowing having a certain continuity on intermediate friction rates.

The used LuGre model is conventionally described by:

$$\frac{dz}{dt} = v - \sigma_0 \frac{|v|}{g(v)} z = v - h(v)z$$

$$F = \sigma_0 z + \sigma_1 \dot{z} + \hat{f}(v)$$

Where v is the speed between two contact surfaces, z is the state of internal friction and F is a determined friction force. Compared to the Dahl model, the LuGre model has a function g(v) dependent on the speed instead of a constant, an additional damping $\sigma_1$ associated to a micro-displacement and a $$F_{ss}(v)=g(v)\text{sgn}(v)+f(v)$$

general form f(v) for the term dependent on the speed and without memory. The state z, which is similar to the effort described in the Dahl model, can be interpreted as a mean deviation. The LuGre model reproduces a return behavior for the small movements, in which the parameter $\sigma 0$ is the stiffness, $\sigma 1$ is the micro-damping and f(v) represents the viscous friction, typically $f(v)=\sigma 2v$. For a constant speed, the stable state of the friction force $F_{ss}$ is given by:

where g(v) depends on the Coulomb's law of friction and the Stribeck effect.

According to a feature of the invention, applying the LuGre according to the invention amounts to modeling the system by a single mass whose speed is represented by the input of the LuGre model.

Advantageously, the LuGre model does not directly give the intermediate friction rate, it estimates the friction coefficient $\mu$ of the system.

According to another feature of the invention, the continuous estimation of the friction coefficient $\mu$ of the system can be represented by the following equation:

$$\mu = \underset{a^*}{sat}\left(\sigma_0\left(V_{vehicle}^{speed}, T_{dynamic}^0\right)\cdot z + \sigma_1\left(V_{vehicle}^{speed}, T_{dynamic}^0\right)\cdot \dot{z}\right)$$

where
V corresponds to the speed of the vehicle,
T corresponds to the steering temperature,
a* corresponds to the dynamic friction coefficient of the system measured on a test bench,
$\sigma 1$ corresponds to the micro-damping,
z corresponds to the state of internal friction.

The friction coefficient $\mu$ varies between +/− the theoretical value a* identified on the bench. Thus, the obtained friction coefficient $\mu$ is configured to vary between +a* and −a*.

It is the division of this coefficient $\mu$ by the theoretical value a* which allows obtaining the intermediate friction rate w, which varies between −1 and +1.

Thus, and according to one embodiment of the invention, the determination of the intermediate friction rate w is carried out according to the following equation:

$$w=\mu/a^*$$

Consequently, the obtained intermediate friction rate is configured to vary between −1 and +1.

According to another feature of the invention, the determination of the second speed of step (b) is carried out according to the following sub-steps:
(s1) measurement of the steering wheel/driver torque, a torque sensor configured to measure the torque between the steering wheel and the rack of the electric power steering,
(s2) time derivation of the torque measurement
(s3) application of the derivative obtained in sub-step s2 to a determined stiffness k
(s4) obtaining a second speed called torque speed The invention also relates to a method for compensating for friction of an electric power steering, characterized in that the compensation method takes into account a continuous estimation of the intermediate friction rate obtained by the continuous estimation method according to invention.

According to another feature of the invention, the compensation method comprises at least the following steps:
E1—Implementation of the continuous estimation method of the intermediate friction rate according to any one of claims 1 to 3, obtaining at least one continuous estimation of the intermediate friction rate (w), and at least one estimated dynamic friction amplitude, and modulation of the estimation of the friction (FRI) by the continuous estimation of the intermediate friction rate (w),
E2—Obtaining the amplitude of a determined friction corresponding to the desired friction $\tau_{FRC}^{target}$ of the electric power steering,
E3—Difference between the estimated dynamic friction amplitude and the desired dynamic friction amplitude
E4—Product of the result of the difference obtained in step E3 with the continuous estimation of the intermediate friction rate (w) in order to obtain a value X,
E5—Difference between the value X obtained in step E4, with the determined estimation of the set of forces opposing the movement (RFE) (to compensate for RFE)
E6—Compensation for the power steering by monitoring the driver torque by a controller (CPU) depending on the target driver torque and the measured driver torque.

Taking into account the continuous estimation of the intermediate friction rate in the compensation method allows changing the hysteresis of the rack effort estimator so that said hysteresis becomes adapted to the desired friction. This compensation method thus allows a greater accuracy in the steering wheel feeling, that is to say that the hysteresis felt is exactly at the desired level. Furthermore, the method allows a robustness function, that is to say that the method is self-adapting depending on the actual friction of the steering.

According to one embodiment of the invention, step E2 can be obtained by means of a chart or a pre-established database or a determined data input.

According to one embodiment of the invention, the monitoring of the driver torque is carried out in a closed loop.

Figure 2:
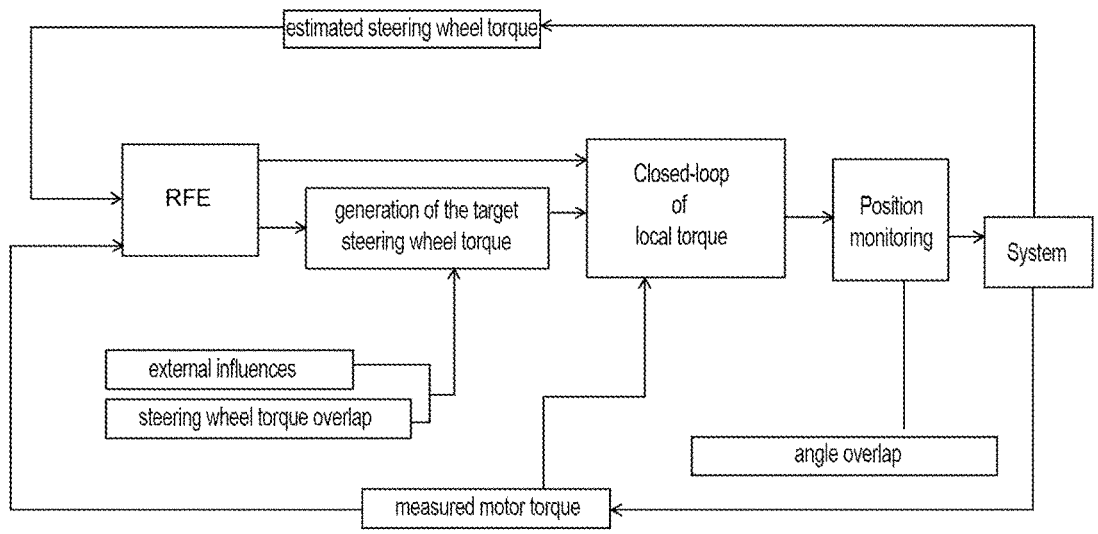
Figure 3:
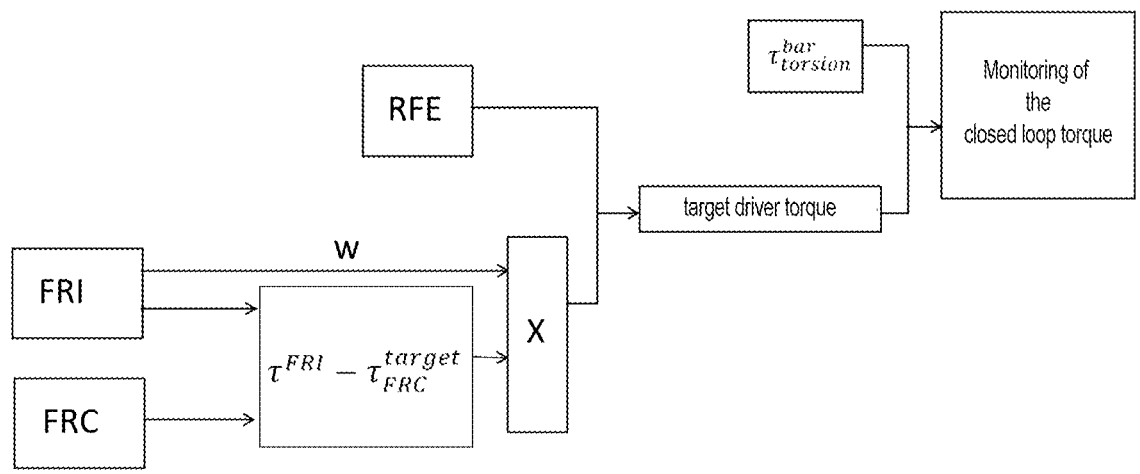
Figure 4:
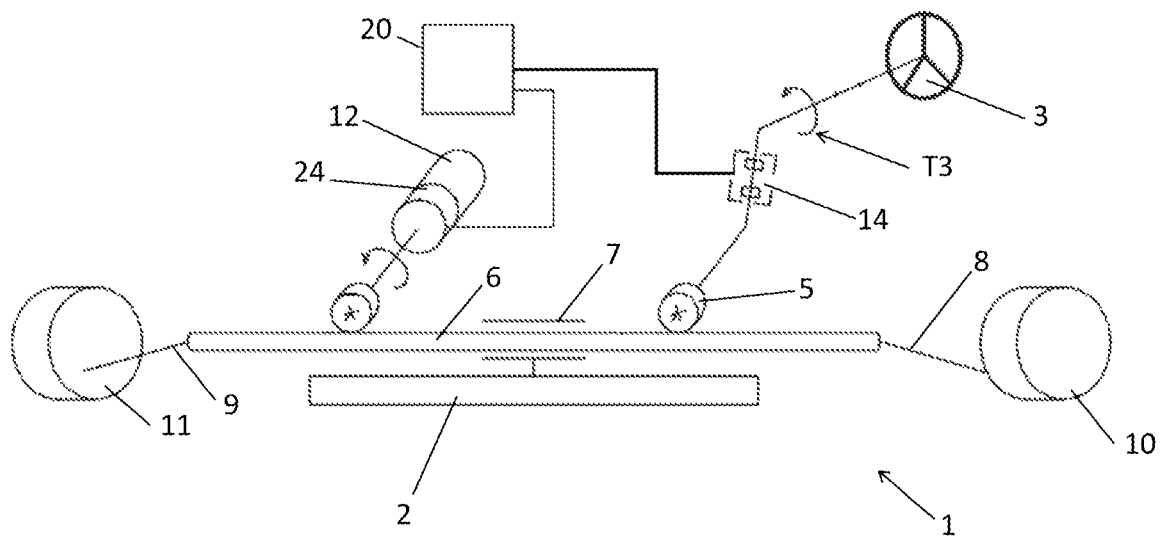
Figure 5:
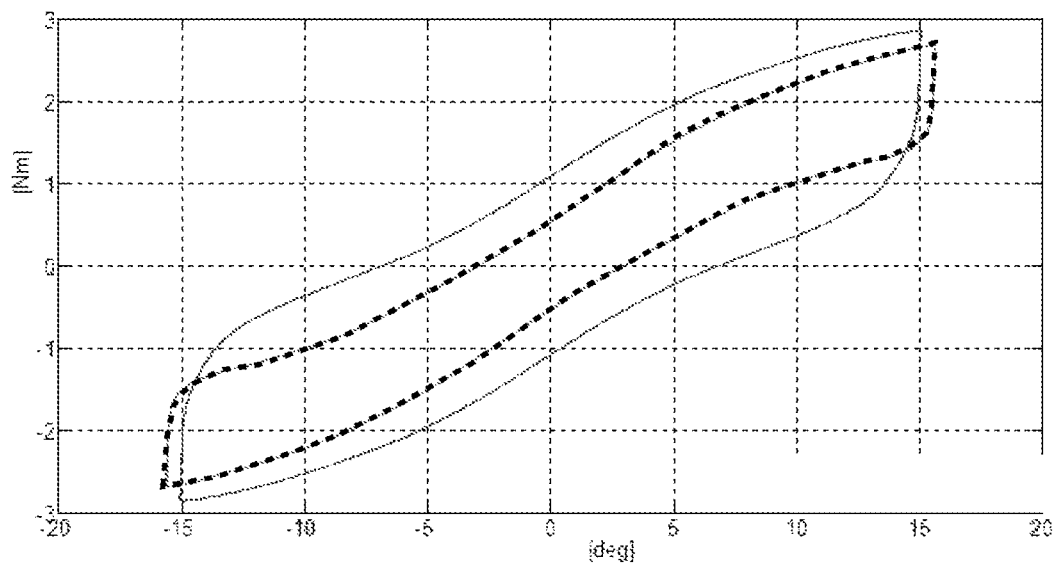

The invention will be better understood, thanks to the description below, which relates to an embodiment of the invention, given by way of non-limiting examples and explained with reference to the appended schematic drawings, in which:

FIG. 1 is a diagram representative of the estimation method according to the invention, FIG. 2 is a diagram representative of an architecture of the controller of the electric power steering implementing the compensation method of the invention, FIG. 3 is a diagram representative of the compensation method according to the invention, FIG. 4 is a schematic view of a steering device to which the invention applies, FIG. 5 is a graph illustrating two hysteresis curves with and without friction compensation.

As illustrated in FIG. 1, the method for continuous estimation of an intermediate friction rate, comprises a step (a) of measuring a first speed by means of a speed sensor of the electric motor of the vehicle. This first speed is represented by the $\dot{\theta}_{pinion}$ reference. The estimation method comprises a step (b) of determining a second speed, comprising a sub-step s1 of measuring the steering wheel/driver torque $\tau_{torsion}^{bar}$ represented by the reference and a sub-step s2 of time derivation of the measurement of the steering wheel torque and in which a gain is applied to the derivative. The estimation method comprises a step (c) of sum of the first and second speeds, represented by the box referenced $\Sigma$, a speed called steering wheel speed referred to as is thus obtained $\dot{\theta}_{steering}^{wheel}$. Step (d) of the estimation method is represented by the box LuGre consisting in simulating a simplified one-dimensional steering model (a mass) and a LuGre friction, whose only input speed is the sum obtained in the previous step (c). Finally, a continuous estimation of the intermediate friction rate of the electric power steering, represented by the reference w, is obtained.

In FIG. 2, a diagram of the controller CPU of the electric power steering of a vehicle is illustrated.

As illustrated in FIG. 3, the compensation method comprises a step E1 of implementing the continuous estimation method, this estimation method is illustrated in detail in FIG. 1 and also taken into account in the friction compensation method.

In FIG. 3, the box referenced FRI represents the estimation of the friction and comprises at least one component which is the continuous estimation of the intermediate friction rate w, obtained by the method illustrated in FIG. 1, and another component which is the estimated dynamic friction amplitude. Furthermore, by means of a chart or a pre-established database, for example a tunable map, the amplitude of the dynamic friction desired for the electric power steering is obtained: this is step E2 of the compensation method which is illustrated in FIG. 3 in the box referenced FRC. In step E3 of the compensation method, the difference between the estimated dynamic friction amplitude and the desired dynamic friction amplitude is made and in step E4, the product of the result of the difference with the continuous estimation of the intermediate friction rate w is made, which allows us to obtain a value X corresponding to the amount of friction to be compensated tcomp. In a step E5, the difference is made between the value X obtained in step E3, with the determined estimation of the set of forces opposing the movement represented by the box referenced RFE and referred to as rack effort estimator. Thanks to this compensation, the hysteresis of the rack force estimator will have a monitored and desired hysteresis which will also impact the hysteresis at the generation of the target torque. In step E6, the target driver torque and the measured driver torque are taken into account for the monitoring of the closed loop torque by the controller CPU illustrated in FIG. 2. In step E6, the action «taking into account» means «comparing and monitoring in closed loop».

By way of example, the electric power steering is at 400N of friction and a feeling at 300N is desired, the friction estimator FRI will identify that the steering is at 400N, and the desired friction value input will be 300N. The difference is therefore 100N, the determined estimation of the set of forces opposing the movement is 400N and 100N is subtracted so that the friction corresponds to the desired value of 300N.

In FIG. 5, a graph is illustrated, representing two curves illustrating the driver steering wheel torque in Nm (ordinates) as a function of the steering wheel angle in degrees (abscissa). The first curve in continuous line illustrates the hysteresis between the driver steering wheel torque and the steering wheel angle without friction compensation. The second curve in dashed line, illustrates the hysteresis with a friction compensation thanks to the methods of the invention. In order to reduce this hysteresis as desired, the area of inversion to + or −15°, when the movement of the steering wheel is reversed, has been adjusted continuously and gradually, as shown in the second discontinuous curve.

In FIG. 4, a steering device is illustrated comprising a power steering allowing implementing the estimation method of the invention as well as the compensation method of the invention. In a manner known per se, and as shown in FIG. 4, said power steering device 1 comprises a steering wheel 3 which allows a driver to maneuver said power steering device 1 by exerting an effort, called «steering wheel torque» T3, on said steering wheel 3. Said steering wheel 3 is preferably mounted on a steering column 4, guided in rotation on the vehicle 2, and which meshes, by means of a steering pinion 5, on a steering rack 6, which is itself guided in translation in a steering casing 7 fastened to said vehicle 2.

Preferably, the ends of said steering rack 6 are each linked to a steering tie rod 8, 9 connected to the stub axle of a steered wheel 10, 11 (respectively a left wheel 10 and a right wheel 11), such that the longitudinal displacement in translation of the rack 6 allows changing the steering angle (yaw angle) of the steered wheels. Moreover, the steered wheels 10, 11 may also preferably be drive wheels.

The power steering device 1 also comprises a motor 12 configured to assist the maneuver of said power steering device 1. The motor will preferably be an electric motor operating in both directions, and preferably a rotary electric motor, of the brushless type.

The power steering device 1 further comprises a steering wheel torque sensor 14 set up especially within the power steering device 1, for example on the steering column 4, in order to measure the steering wheel torque T3, and having the main, even exclusive, purpose of providing a measurement of the steering wheel torque T3, regardless of the measurement technology used by said steering wheel torque sensor 14. In addition, the power steering device 1 comprises a motor speed sensor 24 intended to measure the speed of rotation of the motor 12.

Finally, the power steering device 1 also comprises a calculation and control unit 20 configured to implement the estimation method and the compensation method from sensor data 14, 24.

Of course, the invention is not limited to the embodiments described and represented in the appended figures. Changes remain possible, in particular from the point of view of the constitution of the various elements or by substitution of technical equivalents, without departing from the protection field of the invention.

The invention claimed is:

1. A method for compensating for friction of an electric power steering of a vehicle, the method comprising:
    measuring a first speed by a speed sensor configured to measure a speed of an electric motor of the electric power steering,
    determining a second speed by
        measuring, by a torque sensor, a steering wheel torque between a steering wheel and a rack of the electric power steering,
        time deriving the torque measurement to obtain a torque derivative, and
        computing the second speed by applying the torque derivative to a stiffness,
    computing a steering wheel speed by summing the first speed and the second speed,
    inputting the steering wheel speed to a LuGre model to obtain a continuous estimation of a friction coefficient,
    computing a continuous estimation of an intermediate friction rate by dividing the continuous estimation of the friction coefficient by a dynamic friction coefficient of the power steering, measured on a test bench, and
    compensating for friction of the electric power system using the continuous estimation of the intermediate friction rate.

2. The method according to claim 1, further comprising:
obtaining at least one estimated dynamic friction amplitude, and modulating the estimated dynamic friction amplitude by the continuous estimation of the intermediate friction rate,
obtaining a desired dynamic friction $\tau_{FRC}^{target}$ amplitude of the electric power steering,
computing a difference between the estimated dynamic friction amplitude and the desired dynamic friction amplitude,
computing a product of the difference with the continuous estimation of the intermediate friction rate to obtain an amount of friction to be compensated,
computing a difference between the amount of friction to be compensated and an estimation of a set of forces opposing a movement of the steering wheel,
compensating for the power steering by monitoring the driver torque by a control unit depending on a target driver torque and the measured steering wheel torque.

3. The method according to claim 2, wherein computing the difference between the estimated dynamic friction amplitude and the desired dynamic friction amplitude is performed by using a chart or a pre-established database or a data input.

4. The method according to claim 2, wherein the monitoring of the driver torque is carried out in a closed loop.

5. The method according to claim 3, wherein the monitoring of the driver torque is carried out in a closed loop.

6. The method according to claim 1, wherein the continuous estimation of the friction coefficient is computed using the following equation:

$$\mu = sat_{\alpha^*}(\sigma_0(V,T)z + \sigma_1(V,T)\dot{z})$$

where:
$\mu$ is the continuous estimation of the friction coefficient,
a* is the dynamic friction coefficient of the electric power steering,
V is a speed of the vehicle,
T is a steering temperature,
$\sigma_0$ is a stiffness,
$\sigma_1$ is a micro-damping, and
z is a state of an internal friction.

* * * * *